United States Patent
Hsiao

(10) Patent No.: US 12,165,400 B2
(45) Date of Patent: Dec. 10, 2024

(54) RAILROAD LIGHT DETECTION

(71) Applicant: Waymo LLC, Mountain View, CA (US)

(72) Inventor: Edward Hsiao, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 217 days.

(21) Appl. No.: 17/567,563

(22) Filed: Jan. 3, 2022

(65) Prior Publication Data

US 2022/0121216 A1 Apr. 21, 2022

Related U.S. Application Data

(63) Continuation of application No. 16/171,730, filed on Oct. 26, 2018, now Pat. No. 11,249,487.

(51) Int. Cl.
| | |
|---|---|
| *G06V 10/82* | (2022.01) |
| *G05D 1/00* | (2024.01) |
| *G06N 3/08* | (2023.01) |
| *G06N 5/046* | (2023.01) |
| *G06N 20/00* | (2019.01) |

(Continued)

(52) U.S. Cl.
CPC ........... *G06V 10/82* (2022.01); *G05D 1/0088* (2013.01); *G05D 1/0221* (2013.01); *G05D 1/0246* (2013.01); *G06N 3/08* (2013.01); *G06N 5/046* (2013.01); *G06N 20/00* (2019.01); *G06V 10/764* (2022.01); *G06V 20/584* (2022.01)

(58) Field of Classification Search
None
See application file for complete search history.

(56) References Cited

U.S. PATENT DOCUMENTS

| 4,934,633 A | 6/1990 | Ballinger et al. |
|---|---|---|
| 10,110,860 B1 | 10/2018 | Schofield et al. |

(Continued)

FOREIGN PATENT DOCUMENTS

| CN | 108346315 A | 7/2018 |
|---|---|---|
| DE | 102015218196 A1 | 3/2017 |

(Continued)

OTHER PUBLICATIONS

United States Department of Transportation—Federal Highway Administration Railroad-Highway Grade Crossing Handbook—Revised Second Edition Aug. 2007 Section 4: Identification of Alternatives (continued) Found at: https://toolkits.ite.org/gradecrossing/sec04b.htm (Year: 2007).*

(Continued)

*Primary Examiner* — Thomas E Worden
(74) *Attorney, Agent, or Firm* — Botos Churchill IP Law

(57) ABSTRACT

The technology relates to controlling a vehicle based on a railroad light's activation status. In one example, one or more processors receive images of a railroad light. The one or more processors determine, based on the images of the railroad light, the illumination status of a pair of lights of the railroad light over a period of time as the vehicle approaches the railroad light. The one or more processors determine based on the illumination status of the pair of lights, a confidence level, wherein the confidence level indicates the likelihood the railroad light is active. The vehicle is controlled as it approaches the railroad light based on the confidence level.

20 Claims, 7 Drawing Sheets

(51) Int. Cl.
*G06V 10/764* (2022.01)
*G06V 20/58* (2022.01)

(56) References Cited

U.S. PATENT DOCUMENTS

| | | | |
|---|---|---|---|
| 2006/0119489 A1 | 6/2006 | Shinada et al. | |
| 2006/0180712 A1* | 8/2006 | Hill | B61L 29/28 |
| | | | 246/293 |
| 2008/0043099 A1* | 2/2008 | Stein | B60Q 1/143 |
| | | | 348/118 |
| 2013/0229520 A1 | 9/2013 | Aimura | |
| 2015/0081187 A1 | 3/2015 | Solyom et al. | |
| 2016/0252905 A1* | 9/2016 | Tian | G06V 20/584 |
| | | | 701/23 |
| 2017/0262709 A1* | 9/2017 | Wellington | G06V 10/764 |
| 2018/0208223 A1 | 7/2018 | Israelsson et al. | |
| 2018/0307925 A1 | 10/2018 | Wisniowski et al. | |
| 2018/0309963 A1 | 10/2018 | Schofield et al. | |
| 2020/0066148 A1* | 2/2020 | Werner | H04W 4/46 |
| 2020/0081450 A1* | 3/2020 | Creusot | G08G 1/09623 |
| 2021/0139061 A1* | 5/2021 | Hilleary | B61L 29/30 |

FOREIGN PATENT DOCUMENTS

| | | |
|---|---|---|
| DE | 102016202508 A1 | 8/2017 |
| EP | 2851249 A1 | 3/2015 |
| JP | 2008115823 A | 5/2008 |
| JP | 2011169301 A | 9/2011 |

OTHER PUBLICATIONS

International Search Report and Written Opinion for Application No. PCT/US2019/057825 dated Feb. 14, 2020.
The Extended European Search Report for European Patent Application No. 19876855.8, Mar. 23, 2022.
The First Office Action for Chinese Patent Application No. 201980085600.3, Oct. 12, 2023, 19 Pages.
Notice of Allowance for Chinese Patent Application No. 201980085600.3, Apr. 2, 2024, 7 Pages.

* cited by examiner

RAILROAD LIGHT DETECTION

CROSS REFERENCE TO RELATED APPLICATIONS

The present application is a continuation of U.S. patent application Ser. No. 16/171,730, filed Oct. 26, 2018, the entire disclosure of which is incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. In order to do so safely, these vehicles must be able to detect and identify objects in the environment as well as respond to them quickly. Typically, these objects are identified from information that can be perceived by sensors such as LIDAR, radar, or cameras.

In some instances, detection and identification of the status of active signals and signs is paramount to safely maneuvering a vehicle to its destination. For instance, railroad crossing lights can provide important contextual cues to human drivers about what may be happening or is about to be happening at a railroad crossing in the vehicle's trajectory. Therefore being able to detect and respond to such active signals can be especially important to ensuring a safe and effective autonomous driving experience.

BRIEF SUMMARY

This technology generally relates to controlling a vehicle based on a railroad light's activation status. One aspect of the technology is a method, the method comprising: receiving, by the one or more processors, images of a railroad light; determining, based on the images of the railroad light, by the one or more processors, the illumination status of a pair of lights of the railroad light over a period of time as the vehicle approaches the railroad light; determining, by the one or more processors and based on the illumination status of the pair of lights, a confidence level, wherein the confidence level indicates the likelihood the railroad light is active; and controlling the vehicle as it approaches the railroad light based on the confidence level.

In some instances, a trajectory of the autonomous vehicle is updated based on the confidence level and the vehicle is controlled as it approaches the railroad light based on the updated trajectory.

In some instances, prior to determining the illumination status of the pair of lights, determining the railroad light is positioned along a trajectory of the autonomous vehicle and configured to control traffic travelling in a direction of the vehicle across a railroad track.

In some embodiments, determining the illumination status of the pair of lights further comprises: determining the vehicle's distance from the railroad light; and upon the distance determination being within a predefined threshold distance, determining the illumination status of the pair of lights.

In some embodiments, determining the illumination status of the pair of lights includes: categorizing image data of the images of the railroad light by color and shape; determining the brightness level of portions of the image data categorized as red and circular; and determining the brightness level satisfies or fails to satisfy a threshold value indicating at least one light of the pair of lights is illuminated or not illuminated, respectively. In some instances, determining the brightness level includes using a sliding window based correlation filter. In some embodiments, determining whether the brightness level satisfies or fails to satisfy the threshold value includes using a convolutional neural network.

In some embodiments, determining the illumination status of a pair of lights includes determining an illumination pattern between each light of the pair of lights.

In some embodiments, an updated confidence level indicating a greater likelihood the railroad light is active is determined based on the illumination pattern of the pair of lights, In some embodiments, when the confidence level is a first level, the updated trajectory includes stopping the vehicle before the railroad track. In some instances, when the confidence level is a second level, the updated trajectory is the same as an immediately preceding trajectory. In some instances, when the confidence level is between a first and a second level, the updated trajectory includes slowing down the vehicle.

Another aspect of the technology is directed to a system comprising one or more processors. The one or more processors are configured to receive images of a railroad light; determine, based on the images of the railroad light, the illumination status of a pair of lights of the railroad light over a period of time as the vehicle approaches the railroad light; determine, based on the illumination status of the pair of lights, a confidence level, wherein the confidence level indicates the likelihood the railroad light is active; and control the vehicle as it approaches the railroad light based on the confidence level.

In some embodiments, the one or more processors are further configured to: update, based on the confidence level, a trajectory of the autonomous vehicle; and control the vehicle as it approaches the railroad light based on the updated trajectory.

In some embodiments, prior to determining the illumination status of the pair of lights, determining the railroad light is positioned along a trajectory of the autonomous vehicle and configured to control traffic travelling in a direction of the vehicle across a railroad track. In some embodiments, determining the illumination status of the pair of lights further comprises: determining the vehicle's distance from the railroad light; and upon the distance determination being within a predefined threshold distance, determining the illumination status of the pair of lights.

In some embodiments, determining the illumination status of the pair of lights includes: categorizing image data of the images of the railroad light by color and shape; determining the brightness level of portions of the image data categorized as red and circular; and determining the brightness level satisfies or fails to satisfy a threshold value indicating at least one light of the pair of lights is illuminated or not illuminated, respectively. In some instances, determining the brightness level includes using a sliding window based correlation filter. In some instances, determining whether the brightness level satisfies or fails to satisfy the threshold value includes using a convolutional neural network.

In some embodiments, determining the illumination status of a pair of lights includes determining an illumination pattern between each light of the pair of lights, and wherein the one or more processors are further configured to: determine, based on the illumination status of the pair of lights, an updated confidence level, wherein the updated confidence level indicates a greater likelihood the railroad light is active.

DETAILED DESCRIPTION

Overview

Figure 1B:
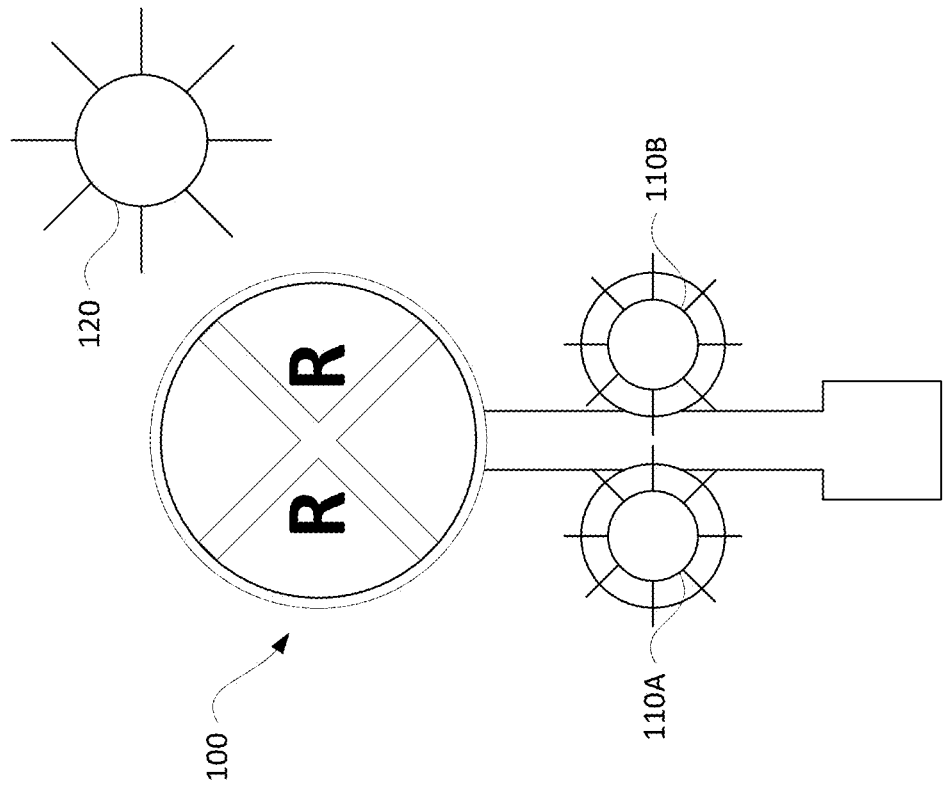
FIGS. 1A and 1B show example railroad lights in accordance with aspects of the disclosure.
Figure 1A:
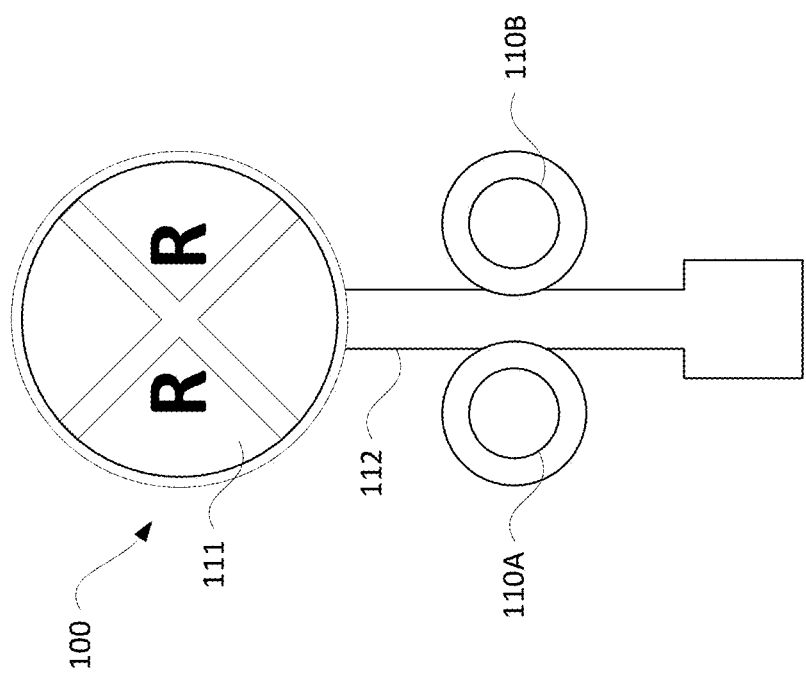

This technology relates to detecting and responding to active railroad lights in the vicinity of a vehicle. As one example, a railroad light assembly 100 controlling a railroad crossing may consist of a sign 111 and a pair of red, circular lights 110A and 110B, attached to a support 112 as shown in FIG. 1A. When the railroad light assembly 100 is activated, the pair of lights 110A, 110B is configured to flash in an alternating pattern to provide a warning to a vehicle, driver, pedestrian, etc., that the railroad crossing and/or railroad tracks are active, including when a train is approaching the railroad tracks.

Determining whether the railroad light assembly 100 is active or inactive may include using one or more sensors, such as a camera, to capture images of the pair of lights by sensors on a vehicle and determining whether one or the other light of the pair of lights are illuminated. However, assuring images of the pair of lights provide an accurate representation of the state of the railroad light may be difficult. For instance, there is a possibility that the sensors may not capture an image of an illuminated light in the pair of lights 100A, 100B, since the lights are typically not illuminated, even when the railroad light is active. In other words, the sensors may capture images of the pair of lights when they are not illuminated, even when the railroad light is activated. Moreover, the slightly larger size of the lights in the pair of lights 100A, 100B, in comparison to typical traffic signal lights (e.g., a "red" light at an intersection), may result in light reflecting off of the pair of lights surfaces. As such, there is a possibility images of the pair of lights 110A and 110B, such as when taken during a time when the sun 120 is low and in front of the lights, may make an inactive railroad light assembly, such as railroad light assembly 100, appear active, as shown in FIG. 1B. Images which do not accurately represent the current status of the railroad light may result in an autonomous, including semi-autonomous vehicles, making incorrect determinations which may lead to unsafe decisions, such as traveling across active railroad tracks (e.g., when a train is approaching or on the railroad tracks) or braking hard to avoid crossing inactive railroad tracks (when a train is not necessarily approaching or on the railroad track).

To address these issues, the actions of the autonomous vehicle may be adjusted based on confidence levels assigned to determinations of the illumination status of the pair of lights over a period of time as the autonomous vehicle approaches the railroad crossing. One or more computing devices in the vehicle may be in communication with various systems of vehicle, such as perception and positioning system. Data received from these systems, including image data captured by the sensors of the perception system, may be analyzed to determine the state information of a railroad light which is positioned along or near the autonomous vehicle's trajectory may be determined.

The determination of the state information of the railroad light may be based on the illumination status of each light of the pair of lights as the vehicle approaches the railroad light. In this regard, the computing device may determine the brightness and/or color intensity of the image data representing the lights. Based on the brightness and/or color intensity, the computing device may classify the light represented by the image data as being illuminated or not.

Based on the illumination classifications, a confidence value indicating the likelihood the railroad light is active or inactive may be determined. In this regard, the confidence level may be increased for some or all detections of an illuminated light or a particular illumination pattern between the lights of the pair of lights. The behavior of the vehicle may be adjusted based on the determined confidence value. In this regard, depending upon the level of the confidence level, such as a low or high level, the vehicle may perform some action, such as slowing down, stopping, speeding up, etc.

The features described herein allow for improved and safer travel of an autonomous vehicle as it approaches and traverses through a railroad crossing. In this regard, the features described herein provide for more reliable detection of active railroad lights. Moreover, by pairing the lights together, the chance of detecting a false positive is reduced and allows the vehicle to slow down earlier should only a single light be determined to be active. As such, evasive maneuvers, such as hard braking to stop before an active railroad light may be avoided.

Example Systems

Figure 2:
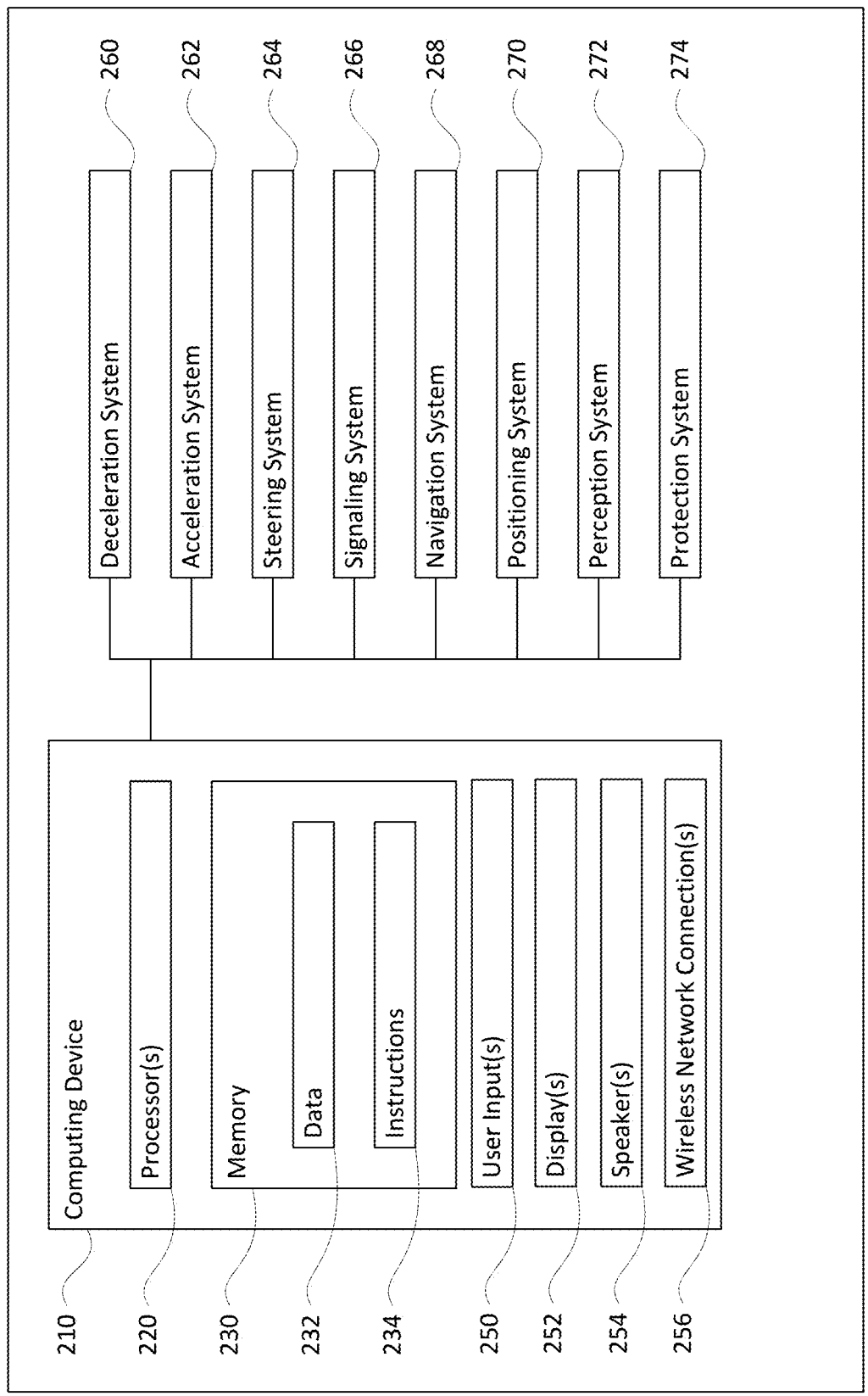
FIG. 2 is a functional diagram of an example vehicle in accordance with aspects of the disclosure.

As shown in FIG. 2, a vehicle 200 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 210 containing one or more processors 220, memory 230 and other components typically present in general purpose computing devices.

The memory 230 stores information accessible by the one or more processors 220, including instructions 234 and data 232 that may be executed or otherwise used by the processor 220. The memory 230 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 234 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 232 may be retrieved, stored or modified by processor 220 in accordance with the instructions 234. For instance, although the claimed subject matter is not limited by any particular data structure, the data may be stored in computing device registers, in a relational database as a table having a plurality of different fields and records, XML documents or flat files. The data may also be formatted in any computing device-readable format.

The processor 220 may be any one or more conventional processors, such as commercially available CPUs. Alternatively, the one or more processors may be a dedicated device such as an ASIC or other hardware-based processor. Although FIG. 2 functionally illustrates the processor, memory, and other elements of computing devices 210 as being within the same block, it will be understood by those of ordinary skill in the art that the processor, computing device, or memory may actually include multiple processors, computing devices, or memories that may or may not be stored within the same physical housing. For example, memory 230 may be a hard drive and/or other storage media located in housing different from that of computing device 210. Accordingly, references to a processor or computing device will be understood to include references to a collection of processors or computing devices or memories that may or may not operate in parallel.

Computing device 210 may include all of the components normally used in connection with a computing device such as the processor and memory described above as well as one or more user inputs 250 (e.g., a mouse, keyboard, touch screen and/or microphone) and various electronic displays (e.g., a monitor having a screen or any other electrical device that is operable to display information). In this example, the vehicle includes one or more internal displays 252 as well as one or more speakers 254 to provide information or audio visual experiences. In this regard, display 252 may be located within a cabin of vehicle 200 and may be used by computing device 210 to provide information to passengers or maintenance personnel within or otherwise in the vicinity of, the vehicle 200.

Computing device 210 may also include one or more wireless network connections 256 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing. Computing device 210 of vehicle 200 may also receive or transfer information from and to other computing devices (not shown), such as computing devices which contain or otherwise store further map or perception data.

In one example, computing device 210 may control the computing devices of an autonomous driving computing system incorporated into vehicle 200. The autonomous driving computing system may capable of communicating with various components of the vehicle in order to control the movement of vehicle 200 according to primary vehicle control code stored in memory 230. For example, computing device 210 may be in communication with various systems of vehicle 200, such as deceleration system 260, acceleration system 262, steering system 264, signaling system 266, navigation system 268, positioning system 270, perception system 272, and power system 274 (i.e. the vehicle's engine or motor) in order to control the movement, speed, etc. of vehicle 200 in accordance with the instructions 234 of memory 230. Again, although these systems are shown as external to computing device 210, in actuality, these systems may also be incorporated into computing device 210, again as an autonomous driving computing system for controlling vehicle 200.

As an example, computing device 210 may interact with one or more actuators or other such components of the deceleration system 260 and/or acceleration system 262, such as brakes, accelerator pedal, and/or the engine or motor of the vehicle, in order to control the speed of the vehicle. Similarly, one or more actuators or other such components of the steering system 264, such as a steering wheel, steering shaft, and/or pinion and rack in a rack and pinion system, may be used by computing device 210 in order to control the direction of vehicle 200. For example, if vehicle 200 is configured for use on a road, such as a car or truck, the steering system may include one or more actuators or other such devices to control the angle of wheels to turn the vehicle. Signaling system 266 may be used by computing device 210 in order to signal the vehicle's intent to other drivers or vehicles, for example, by lighting turn signals or brake lights when needed.

Figure 4:
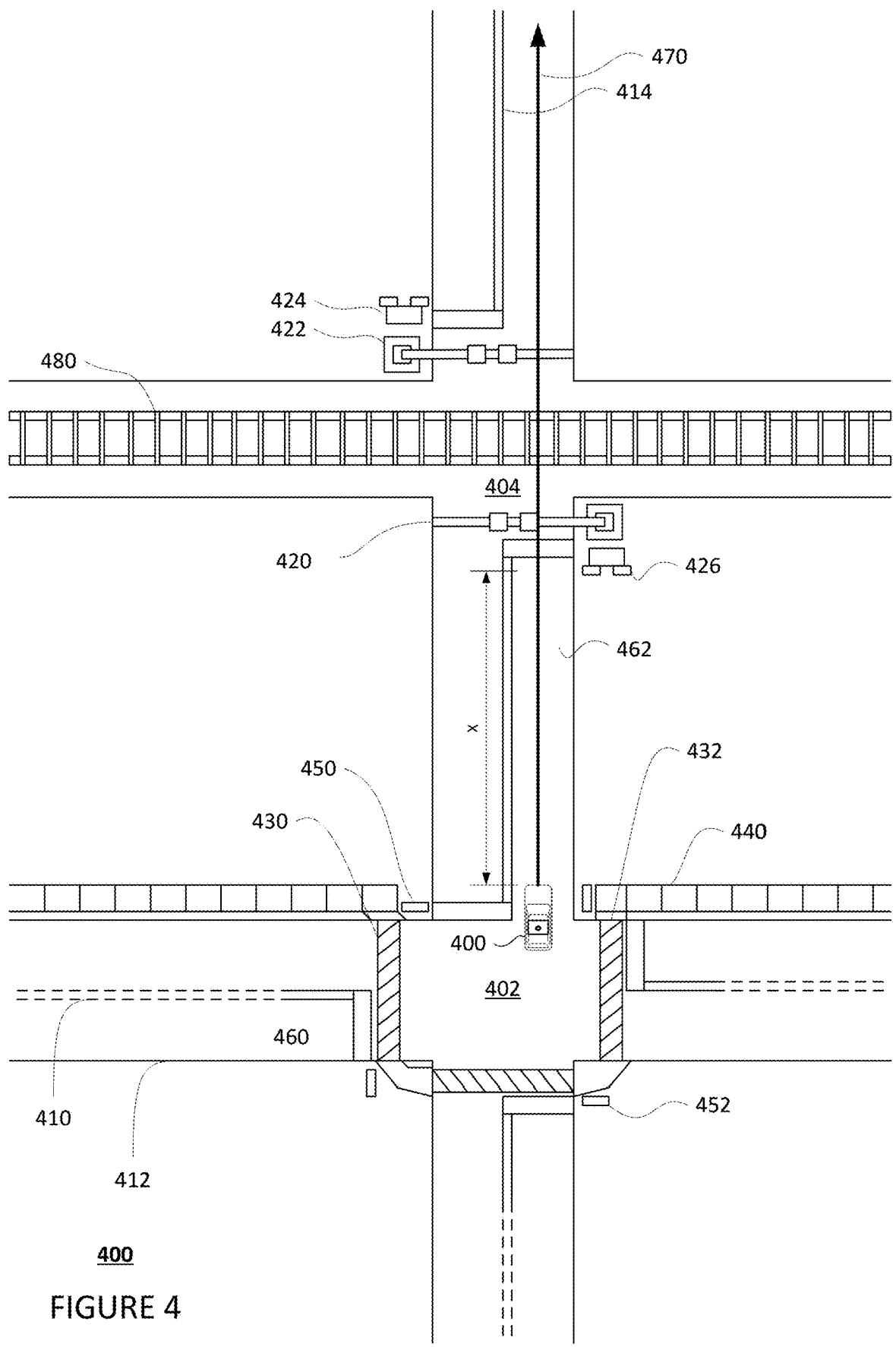
FIG. 4 is an example view of a section of roadway corresponding to map information in accordance with aspects of the disclosure.

Navigation system 268 may be used by computing device 210 in order to determine and follow a route to a location. In this regard, the navigation system 268 and/or data 232 may store detailed map/roadmap information, e.g., highly detailed maps identifying the shape and elevation of roadways, lane lines, intersections, crosswalks, speed limits, traffic signals, buildings, signs, real time traffic information, vegetation, or other such objects and information. For instance, FIG. 4 shows example map information identifying the shape, location, and other characteristics of various road features proximate to intersection 402 and railroad crossing 404. In this example, the map information 400 includes information defining the shape and location of lane markers 410-414, railroad crossing gates 420, 422, railroad light assemblies 424, 426 (which may be the same as or similar to railroad light assembly 100), railroad tracks 480, crosswalks 430, 432, sidewalk 440, stop signs 450, 452, as well as the shape and direction of traffic for lanes 460, 462, etc. Although the example of map information 400 includes only a few road features, for instance, lane lines, shoulder areas, an intersection, and lanes and orientations, map information 400 may also identify various other road features such as traffic signal lights, crosswalks, sidewalks, stop signs, yield signs, speed limit signs, road signs, speed bumps, etc. Although not shown, the map information may also include information identifying speed limits and other legal traffic requirements, such as which vehicle has the right of way given the location of stop signs or state of traffic signals, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 270 may be used by computing device 210 in order to determine the vehicle's relative or absolute position on a map or on the earth. For example, the positioning system 270 may include a GPS receiver to determine the positioning system's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 270 may also include other devices in communication with computing device 210, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 210, other computing devices and combinations of the foregoing.

The perception system 272 may also include one or more components for detecting objects external to the vehicle such as other vehicles, obstacles in the roadway, traffic signals, signs, trees, etc. For example, the perception system 272 may include lasers, sonar, radar, cameras and/or any other detection devices that record data which may be processed by computing device 210. For example, the perception system 272 may include lasers, sonar, radar, cameras and/or any other detection devices that record data which may be processed by the computing device. In some instances, the perception system may include a laser or other sensors mounted on the roof or other convenient location of a vehicle. For instance, the perception system 272 may use various sensors, such as LIDAR, sonar, radar, cameras, etc. to detect objects and their characteristics such as location, orientation, size, shape, type, direction and speed of movement, etc. In the case where the vehicle is a passenger vehicle such as a minivan, the minivan may include a laser or other sensors mounted on the roof or other convenient location.

Figure 3:
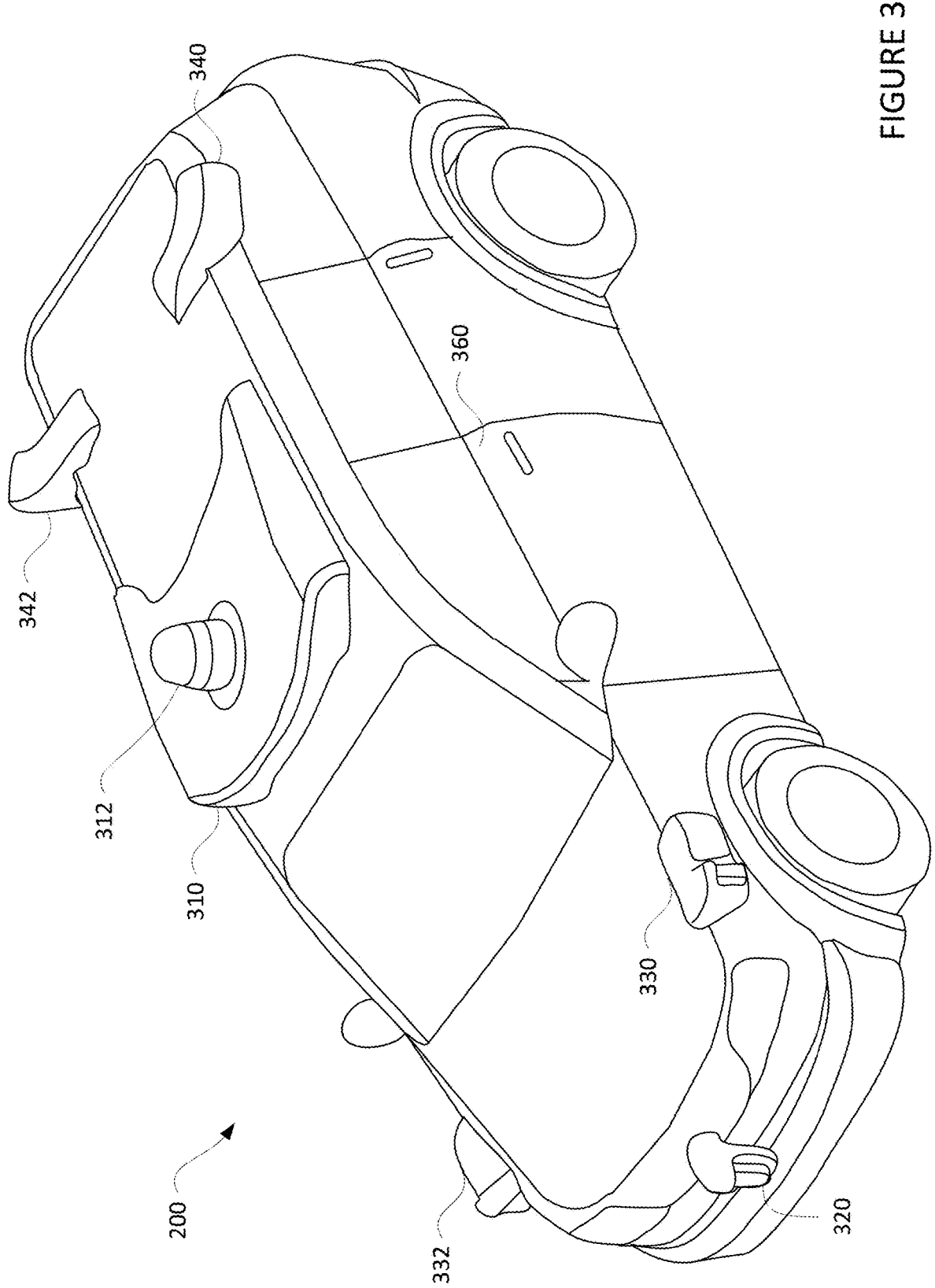
FIG. 3 is an example representative view of a vehicle in accordance with aspects of the disclosure.

For instance, FIG. 3 is an example external view of vehicle 200. In this example, a roof-top sensor housing 310 and a dome sensor housing 312 may include one or more lidar sensors, cameras, and/or radar units. In addition, housing 320 located at the front end of vehicle 200 and housings 330, 332 on the driver's and passenger's sides of the vehicle may each store a lidar sensor. For example, housing 330 is located in front of driver door 360. Vehicle 200 also includes housings 340, 342 for radar units and/or cameras also located on the roof of vehicle 200. Additional radar units and cameras (not shown) may be located at the front and rear ends of vehicle 200 and/or on other positions along the roof or roof-top sensor housing 310. In this regard, each of housings 310, 312, 320, 330, 332, 340, and 342 may be considered sensor housings any or all of the aforementioned sensors may be considered a part of the vehicle's perception system 272.

The computing device may use the positioning system to determine the vehicle's location and perception system to detect and respond to objects, such as a railroad light (including a pair of lights) and/or railroad crossing, when needed to reach the location safely. In order to do so, computing devices may cause the vehicle to accelerate (e.g., by increasing fuel or other energy provided to the engine by acceleration system), decelerate (e.g., by decreasing the fuel supplied to the engine, changing gears, and/or by applying brakes by deceleration system), change direction (e.g., by turning the front or rear wheels of vehicle by steering system), and signal such changes (e.g., by lighting turn signals of signaling system). Thus, the acceleration system and deceleration system may be a part of a drivetrain that includes various components between an engine of the vehicle and the wheels of the vehicle. Again, by controlling these systems, computing devices may also control the drivetrain of the vehicle in order to maneuver the vehicle autonomously.

Based on data received from the various system components, the computing devices may control the direction, speed, acceleration, etc. of the vehicle by sending instructions to the various components of the vehicle. For instance, the computing devices may navigate the vehicle to a destination location completely autonomously using data from the map information and navigation system.

The memory 130 may store various software modules and models. These models include learned models, for instance, those that utilize machine learning, such as classifiers. As discussed herein, the classifier, once trained, may be used to identify active and inactive railroad lights as well as a confidence or likelihood value for the railroad light status.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

To detect a railroad light's state (e.g., active or inactive) the computing device 210 may analyze images of the railroad light as the vehicle approaches a railroad crossing. As noted herein, map data may include details of the locations of railroad lights and railroad crossings and the positioning system may include details as to the location of the vehicle relative to the railroad lights. The analysis of images may begin once the autonomous vehicle is a certain distance, such as 150 meters, or more or less, from a railroad light positioned along or near the autonomous vehicle's trajectory and configured to control traffic in the vehicle's direction. The distance determination may be made by the computing device 210 based on the map data and positioning system 270 the location of the vehicle relative to the railroad light assembly 100.

For instance, and again referring to FIG. 4, an example of vehicle 200 is shown maneuvering on a portion of roadways (460, 462) corresponding to an area of map information 400. In this regard, vehicle 200 is crossing intersection 402 and entering lane 462, by following trajectory 470. The trajectory 470 will, if followed, take vehicle 200 across railroad crossing 404, which is controlled by railroad light assembly 426. Accordingly, once the vehicle's computing device 210 detects the distance between the vehicle and the railroad light assembly 426, labeled as X in FIG. 4, is at or within a certain threshold distance, the computing devices 210 and/or the perception system 272 may analyze the images for state information of the railroad light assembly 426. In some instances, multiple sensors of the perception system 272 may capture images of the railroad light at the same time. In such instances, the image data corresponding to the image having the clearest, most direct line of sight of the lights of the railroad light may be selected for analysis.

The analysis may include monitoring the illumination status of each light of the pair of lights of the railroad light via images from the perception system 172 over a period of time as the vehicle approaches the railroad light. For instance, the computing device 210 may continuously, or periodically, classify the color and shape the image data representing the areas around and including the lights of the pair of lights 100A, 100B. As railroad lights generally use round red lights, the computing device may determine the brightness and/or color intensity of portions of the image data which are categorized as red and round. For instance, a sliding window based correlation filter may be used to determine the intensity of the image data categorized as red and round over periods of time.

A convolutional neural network may be used to classify whether a light is illuminated or not based on the intensity determination output by the sliding window based correlation filter. In this regard, image data which satisfies brightness and/or color intensity thresholds as determined by the convolutional neural network may indicate the light represented by the image data is illuminated. The intensity thresholds may be chosen empirically based on conditions at the location of a particular railroad light, such as ambient light, sun location relative to the light, etc. As such, the threshold levels may be adjusted based on the time of day, season, etc., where the railroad light is positioned, and/or the historical brightness of the railroad light.

Figure 5:
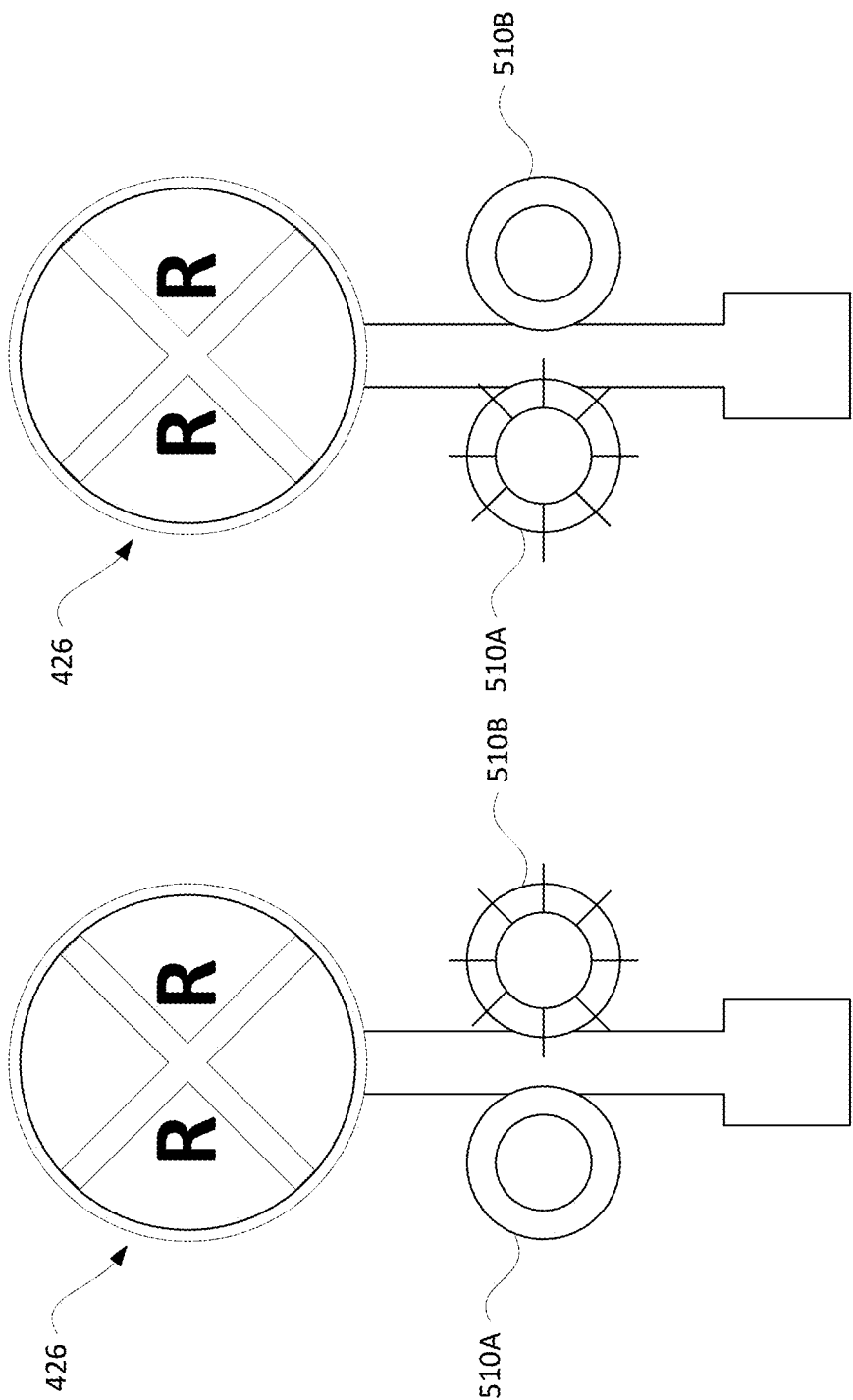
FIGS. 5A and 5B show an example illumination of railroad lights in accordance with aspects of the disclosure

In some instances, the pair of lights 100A, 100B of the railroad light assembly 100 may be paired together to determine whether the illumination pattern of the pair of lights matches a typical railroad light. In this regard, the lights of a pair of lights of a railroad light may typically flash alternately at a rate of 45 to 65 times per minute, or more or less. As such, the computing device 210 may monitor the illumination pattern of the pair of lights to determine whether the lights are illuminating in an alternating pattern consistent with that of a typical railroad light. For instance, and as shown in FIG. 5A, a first light 510B of the pair of lights on railroad light assembly 426, which may be compared to railroad light assembly 100, may be determined to be illuminated. Immediately, or shortly, such as one second, or more or less, after the first light 510B is determined to no longer be illuminating, second light 510A may be determined to be illuminated, as shown in FIG. 5B. In such an instance, the illumination pattern of the pair of lights of railroad light assembly 426 may be determined to be consistent with that of a typical railroad light assembly.

Each detection, or lack thereof, of a single light of a pair of lights illuminating or both lights of the pair of lights illuminating may be used to adjust a confidence level. The confidence level may indicate a confidence in the computing device 210's determination of the likelihood of the railroad light is active or inactive. In this regard, the confidence level may be increased for each detection of an illuminated light or for each detection of a particular illumination pattern, such as the illumination pattern of a typical railroad light, as described herein. For instance, in the event the computing devices 210 determines the pair of lights 510A, 510B are illuminating in a pattern consistent with that of a typical railroad light, as illustrated in FIGS. 5A and 5B, the confidence level may be increased, as it is more likely that the railroad light assembly 426 is active. In another example, if the computing devices 210 determine a single light or both lights of the pair of lights 510A, 510B have illuminated multiple times, the confidence level may be increased by a small amount each time.

The computing device 210 may determine railroad light is active upon the confidence level satisfying a threshold value. In this regard, upon a certain number of detections of a light or both lights of the pair of lights being illuminated, the confidence level may be increased to a level such that the confidence level satisfies a threshold level, thereby indicating that the railroad light is active. In instances where no illumination is detected or illumination has not been detected for a certain time period, such as 2 seconds, or more or less, the confidence level may be decreased, as it is more likely that the railroad light is inactive. If the confidence level is below (or was above and drops below the threshold level, the computing devices may consider the railroad light to be inactive. In addition, where the two lights of the pair of lights are determined to be illuminated at the same time, which is not within the function of a typical railroad light, such as may occur when the sun is low and in front of the lights, the confidence level may also be decreased.

Figure 6:
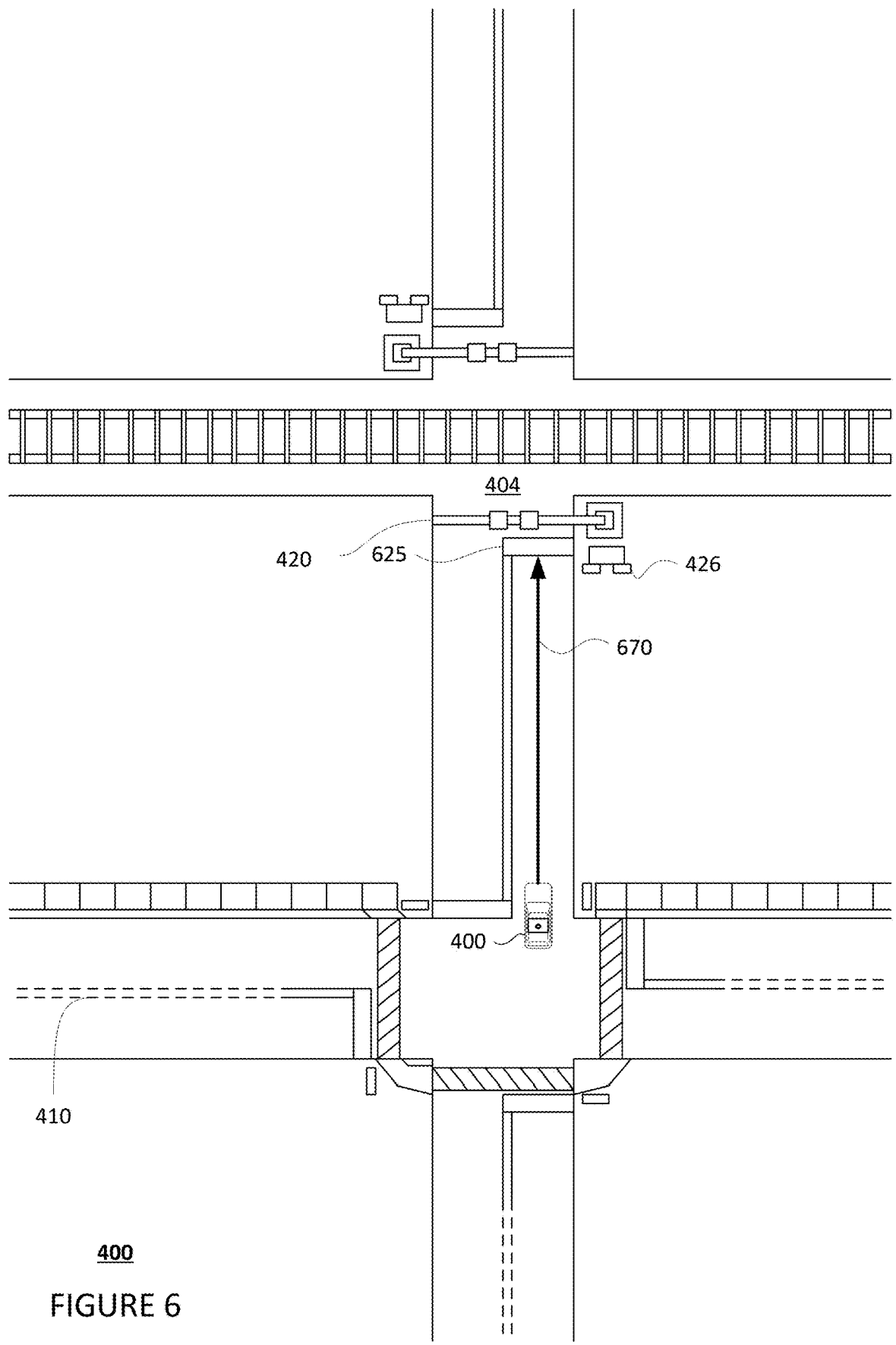
FIG. 6 is an example view of a section of roadway corresponding to map information and an updated vehicle trajectory in accordance with aspects of the disclosure.

The computing device 210 and/or navigation system 268 of the vehicle may adjust the behavior of the vehicle based on the confidence level. In this regard, the computing device may pass to the vehicle's navigation system 268 the confidence level or data indicating the computing device 210 has determined confidence level indicates an active or inactive railroad light. Depending upon the level of the confidence level or whether the computing device 210 has determined the railroad light is active or inactive, the navigation system 268 may instruct the vehicle to perform some action. For instance, when the navigation system 268 receives a confidence level below the threshold value, indicating the railroad light is inactive, the navigation system may instruct the vehicle 400 to maintain its current trajectory, such as trajectory 470, including its speed and acceleration. In another example, when the navigation system 268 receives a confidence level within a certain predefined value of the threshold value, but not satisfying the threshold value, the navigation system may cause the vehicle to slow down to allow more time for the computing device to receive more data such that the confidence level may be adjusted such that it indicates an active or inactive railroad light. In yet another example, when the confidence level is high that a railroad light, such as railroad light assembly 426 is active, the navigation system 268 may generate an updated trajectory 670, which instructs the vehicle 400 to slow down and stop at the stop line 625 at railroad crossing 404, as shown in FIG. 6. Although the confidence levels are discussed in terms of high and low, any scale may be use to indicate the confidence of the computing device in its determination as to whether the railroad light is active or inactive, such as a 1-10, 1-100, etc.

Machine learning models may be used to refine or recalculate the confidence level determinations. In this regard, inputs such as the light illumination determinations discussed herein, as well as detections of train noises, downed railroad gates, bicycles, pedestrians, and/or vehicle's stopped in front of railroad gates, such as railroad gates, images captured in the vicinity of the railroad tracks showing a train traveling on the tracks, train schedules, etc., may be fed into the model. Based on the inputs, the model may output an adjusted confidence level. The adjusted confidence level may be recalculated each time new inputs are fed into the machine learning model. In some instances, previous confidence levels may be input into the machine learning model to provide a starting point for determining the adjusted or new confidence level determination. For instance, when the inputs of the model include a detection of an illuminated railroad light, such as railroad light 426 and downed railroad gates, such as railroad gates 420, the confidence level may be high. As such that the navigation system 268 may instruct the vehicle to slow down (i.e., decrease velocity and/or acceleration) and stop at the stop line 625, as shown in FIG. 6.

Figure 7:
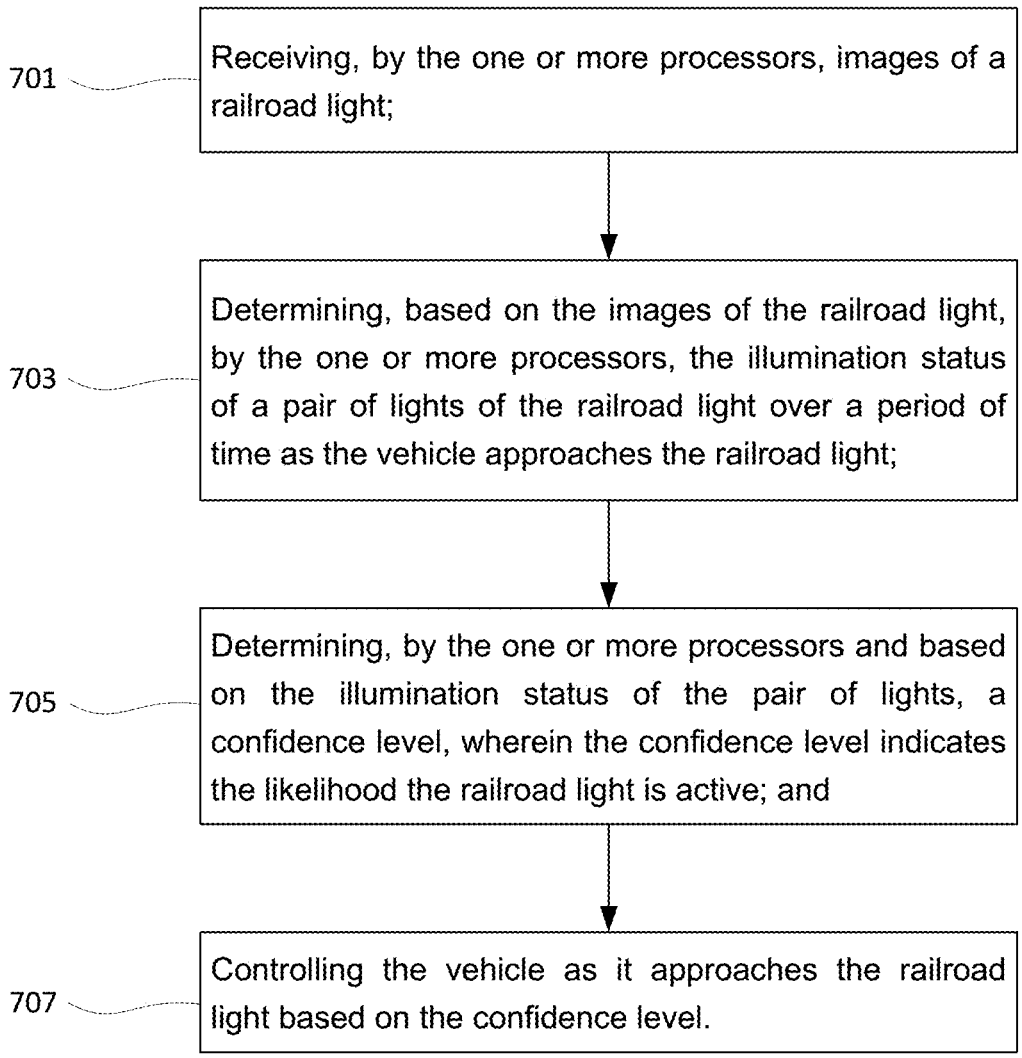
FIG. 7 is a flow diagram in accordance with aspects of the disclosure.

FIG. 7 is a flow diagram 700 that may be performed by one or more processors such as one or more processors 220 of computing devices 210 in order to control a vehicle, such as vehicle 200 based on a railroad light's activation status. At block 701, images of a railroad light are received by one or more processors. At block 703, the illumination status of a pair of lights of the railroad light over a period of time as the vehicle approaches the railroad light is determined by the one or more processors based on the images of the railroad light. At block 705, a confidence level is determined by the one or more processors based on the illumination status of the pair of lights, wherein the confidence level indicates the likelihood the railroad light is active. And at block 707, the vehicle is controlled as it approaches the railroad light based on the confidence level.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computing device comprising:
one or more processors, wherein the one or more processors are configured to:
receive images of a pair of lights of a railroad light assembly;
analyze the images of the pair of lights of the railroad light assembly in order to modify, based on one or more illumination patterns of the pair of lights of the railroad light assembly, a confidence level that indicates a likelihood that the railroad light assembly is active;
control a vehicle to autonomously take a first action when the modified confidence level satisfies a first threshold condition; and
control the vehicle to autonomously take a second action, different from the first action, when the modified confidence level does not satisfy the first threshold condition.

2. The computing device of claim 1, wherein the one or more processors are further configured to determine, based on one or more road features, whether the vehicle has reached a location that is a predefined threshold distance away from the railroad light assembly.

3. The computing device of claim 2, wherein the one or more processors are further configured to analyze the images of the pair of lights of the railroad light assembly when the vehicle is determined to have reached the location that is the predefined threshold distance away from the railroad light assembly.

4. The computing device of claim 1, wherein the one or more processors are further configured to:
update, based on the modified confidence level, a trajectory of the vehicle; and
control the vehicle as the vehicle approaches the railroad light assembly based on the updated trajectory.

5. The computing device of claim 1, wherein the one or more processors are further configured to:
categorize image data of the images of the pair of lights of the railroad light assembly by color and shape;
determine a brightness level of portions of the image data categorized as red and circular; and
determine whether the brightness level satisfies or fails to satisfy a second threshold condition indicating that at least one light of the pair of lights is illuminated or not illuminated, respectively.

6. The computing device of claim 5, wherein the one or more processors use a sliding window based correlation filter to determine the brightness level.

7. The computing device of claim 5, wherein the one or more processors use a convolutional neural network to determine whether the brightness level satisfies or fails to satisfy the second threshold condition.

8. The computing device of claim 1, wherein the modification includes increasing the confidence level when one of the one or more illumination patterns indicates an alternating flash rate consistent with a typical railroad light assembly indicating a number of alternating flashes per time unit between each light of the pair of lights.

9. The computing device of claim 1, wherein the modification includes decreasing the confidence level when one of the one or more illumination patterns does not indicate an alternating flash rate consistent with a typical railroad light assembly indicating a number of alternating flashes per time unit between each light of the pair of lights.

10. The computing device of claim 9, wherein the modification includes decreasing the confidence level when at least one of the following is detected: i) no illumination of either of the pair of lights of the railroad light assembly; ii) illumination of one or both of the pair of lights has not been detected for a period of time inconsistent with a typical railroad light assembly; and iii) simultaneous illumination of both of the pair of lights of the railroad light assembly.

11. The computing device of claim 1, wherein the one or more processors are further configured to:
control the vehicle to autonomously take a third action, different from the first action and the second action, when the modified confidence level is within a predefined value of a predetermined confidence threshold value based on the first threshold condition, wherein the predetermined confidence threshold value is a value of the modified confidence level indicating that the railroad light assembly is active.

12. The computing device of claim 8, wherein the alternating flash rate consistent with a typical railroad light assembly is between 45 and 65 times per minute.

13. A system comprising:
one or more sensors configured to capture images of a pair of lights of a railroad light assembly; and
a computing device including one or more processors, wherein the one or more processors are configured to:
receive the images of the pair of lights of the railroad light assembly from the one or more sensors;
analyze the images of the pair of lights of the railroad light assembly in order to modify, based on one or more illumination patterns of the pair of lights of the railroad light assembly, a confidence level that indicates a likelihood that the railroad light assembly is active;
control a vehicle to autonomously take a first action when the modified confidence level satisfies a first threshold condition; and
control the vehicle to autonomously take a second action, different from the first action, when the modified confidence level does not satisfy the first threshold condition.

14. The system of claim 13, wherein the one or more processors are further configured to determine, based on one or more road features, whether the vehicle has reached a location that is a predefined threshold distance away from the railroad light assembly.

15. The system of claim 14, wherein the one or more processors are further configured to analyze the images of the pair of lights of the railroad light assembly when the vehicle is determined to have reached the location that is the predefined threshold distance away from the railroad light assembly.

16. The system of claim 13, wherein the one or more processors are further configured to:
update, based on the modified confidence level, a trajectory of the vehicle; and
control the vehicle as the vehicle approaches the railroad light assembly based on the updated trajectory.

17. The system of claim 13, wherein the one or more processors are further configured to:
categorize image data of the images of the pair of lights of the railroad light assembly by color and shape;
determine a brightness level of portions of the image data categorized as red and circular; and
determine whether the brightness level satisfies or fails to satisfy a second threshold condition indicating that at least one light of the pair of lights is illuminated or not illuminated, respectively.

18. The system of claim 17, wherein the one or more processors use a sliding window based correlation filter to determine the brightness level; and
wherein the one or more processors use a convolutional neural network to determine whether the brightness level satisfies or fails to satisfy the second threshold condition.

19. The system of claim 13, wherein the modification includes increasing the confidence level when one of the one or more illumination patterns indicates an alternating flash rate consistent with a typical railroad light assembly indicating a number of alternating flashes per time unit between each light of the pair of lights.

20. The system of claim 19, wherein the alternating flash rate consistent with a typical railroad light assembly is between 45 and 65 times per minute.

* * * * *